United States Patent [19]

Vrillon

[11] 4,283,615
[45] Aug. 11, 1981

[54] DEVICE FOR STOPPING A LEAK IN A STRAIGHT PORTION OF A HEAT-EXCHANGER TUBE

[75] Inventor: Bernard Vrillon, Wissous, France

[73] Assignee: Commissariat a l'Energie Atomique, Paris, France

[21] Appl. No.: 38,315

[22] Filed: May 11, 1979

[30] Foreign Application Priority Data

May 17, 1978 [FR] France ................................ 78 14545

[51] Int. Cl.³ ...................... B23K 31/06; B22D 19/10; B23K 11/30; F28F 11/06
[52] U.S. Cl. ......................................... 219/66; 219/67; 219/119; 29/402.16; 165/76
[58] Field of Search .................. 219/59.1, 66, 67, 119, 219/160; 138/97, 98; 228/119; 165/76; 29/402.01, 402.09, 402.16

[56] References Cited

U.S. PATENT DOCUMENTS

| | | | |
|---|---|---|---|
| 2,883,517 | 4/1959 | Rice et al. | 219/67 |
| 3,239,645 | 3/1966 | Monroe | 219/66 X |
| 3,781,966 | 1/1974 | Lieberman | 165/76 X |
| 3,962,767 | 6/1976 | Byerley et al. | 165/76 X |
| 4,028,789 | 6/1977 | Loch | 165/76 X |

FOREIGN PATENT DOCUMENTS 1136400 12/1968 United Kingdom ...................... 219/66

Primary Examiner—B. A. Reynolds
Assistant Examiner—Keith E. George

[57] ABSTRACT

An axial mandrel having good electrical conductivity is fitted with conical metal washers and insulating pastilles in alternate sequence. A nut applied against an insulating support at the lower end of the mandrel exerts a compressive stress on the washers, the peripheral edges of which are applied against a lining sleeve placed within a leaky portion of a heat-exchanger tube. Each washer thus exerts a radial force which applies the sleeve in intimate contact with the tube along a number of circular lines corresponding to the number of washers. An electric current is passed through the mandrel, the washers, the lining sleeve, thus uniting the tube and the lining sleeve by means of circular resistance welds.

14 Claims, 5 Drawing Figures

DEVICE FOR STOPPING A LEAK IN A STRAIGHT PORTION OF A HEAT-EXCHANGER TUBE

This invention relates to a device for stopping or sealing-off an accidental leak which has developed in one of the tubes of a bundle, especially in a heat exchanger of the steam-generating type. In accordance with customary practice, said heat-exchanger tubes are rigidly fixed at one or both ends (respectively in the case of straight tubes or in the case of U-tubes) to a tube plate which divides the interior of a heat-exchanger shell into two regions. The first region is reserved for the admission of a primary fluid into the tubes after it has passed through the tube plate. The second region is reserved for the flow of a secondary fluid which surrounds the tubes and exchanges heat with the primary fluid through the tube walls.

It is readily apparent that perforations or ruptures of a certain number of tubes are liable to take place as a result of vibrations, wear, corrosion or other causes during operation of steam generators, especially when they are subjected to high mechanical and thermal stresses as a result of the nature or temperatures of the fluids which are present. Incidents of this type may in turn be attended by extremely harmful consequences. In particular, in certain nuclear installations, the radioactive primary fluid is liable to contaminate the secondary fluid in the event of perforation of one or a number of tubes. A further potential danger in this type of installation lies in the fact that the primary fluid which may consist of liquid metal undergoes a violent reaction with the secondary fluid consisting of water. Depending on the leakage flow rate, the reaction thus produced rapidly causes damage to adjacent tubes, with the result that the heat exchanger becomes totally unserviceable.

In the event of perforation of a tube within the bundle, the conventional method consists in plugging the tube at both ends after detection of the fault, thus completely withdrawing the tube from service. If a large number of damaged tubes are involved, however, it is apparent that the resultant limitation of available heat-exchange surface then becomes considerable. In addition, there is an appreciable loss of efficiency of the installation which, in extreme cases, may have the effect of putting the entire heat exchanger out of service.

The aim of the present invention is to provide a device which, in the event of leakage in any one tube of the bundle of a heat exchanger and after location of the tube in which the leak has occurred, accordingly serves to withdraw said tube from service while at the same time carrying out localized stopping of the leak. The faulty tube can thus be maintained in operation after a simple and effective repair which can be performed with ease.

To this end, the device under consideration essentially comprises an axial mandrel of material having good electrical conductivity on which are engaged metal washers of revolution having a conical profile and separated by cylindrical insulating pastilles, an insulating head fixed at one end of the axial mandrel and an insulating support mounted at the end opposite to said head. A threaded portion of said mandrel passes freely through said support and is adapted to cooperate with a nut which is applied against the support and serves to exert on the conical washers an adjustable initial compressive stress such that the outer peripheral edges of said washers are applied against a thin cylindrical lining sleeve which is coaxial with the mandrel, the external diameter of said sleeve being smaller than the internal diameter of the tube in which the leak to be stopped is located. The device further comprises means for introducing the support within the lining sleeve and then introducing the sleeve within the tube in order to place said sleeve opposite to a region which includes said leak, and means for subjecting the mandrel aforesaid to an axial displacement with respect to said support so that the conical washers are compressed to a maximum extent and thus undergo a change from a conical profile to a more flattened profile. Each washer accordingly exerts on said lining sleeve a radial force which applies said sleeve in intimate contact with said tube along a number of circular lines corresponding to the number of washers. Finally, means are provided for passing an electric current successively through the mandrel, the washers, the lining sleeve and the tube in order to join the tube and the sleeve by means of resistance welds formed along said circular lines.

Local sealing of the tube at the level of the leak in this latter is thus achieved in a perfectly fluidtight manner by welding the lining sleeve against the tube along at least two circular lines but preferably a greater number of lines. The pressure exerted by the washers at the point of maximum flattening by compression makes it possible to form the welded joints under optimum conditions. The lining sleeve employed for sealing the tube is preferably a thin tube of material which is either identical or different from that of the perforated tube. The external diameter of said lining sleeve is slightly smaller than the internal diameter of the tube in order to ensure that said sleeve can readily be displaced without jamming within the straight portion of the tube, due allowances being made for manufacturing tolerances.

Further distinctive features of a plugging and sealing device as designed in accordance with the invention will become apparent from the following description of one exemplified embodiment which is given by way of indication and not in any limiting sense, reference being made to the accompanying drawings, wherein.

Figure 1:
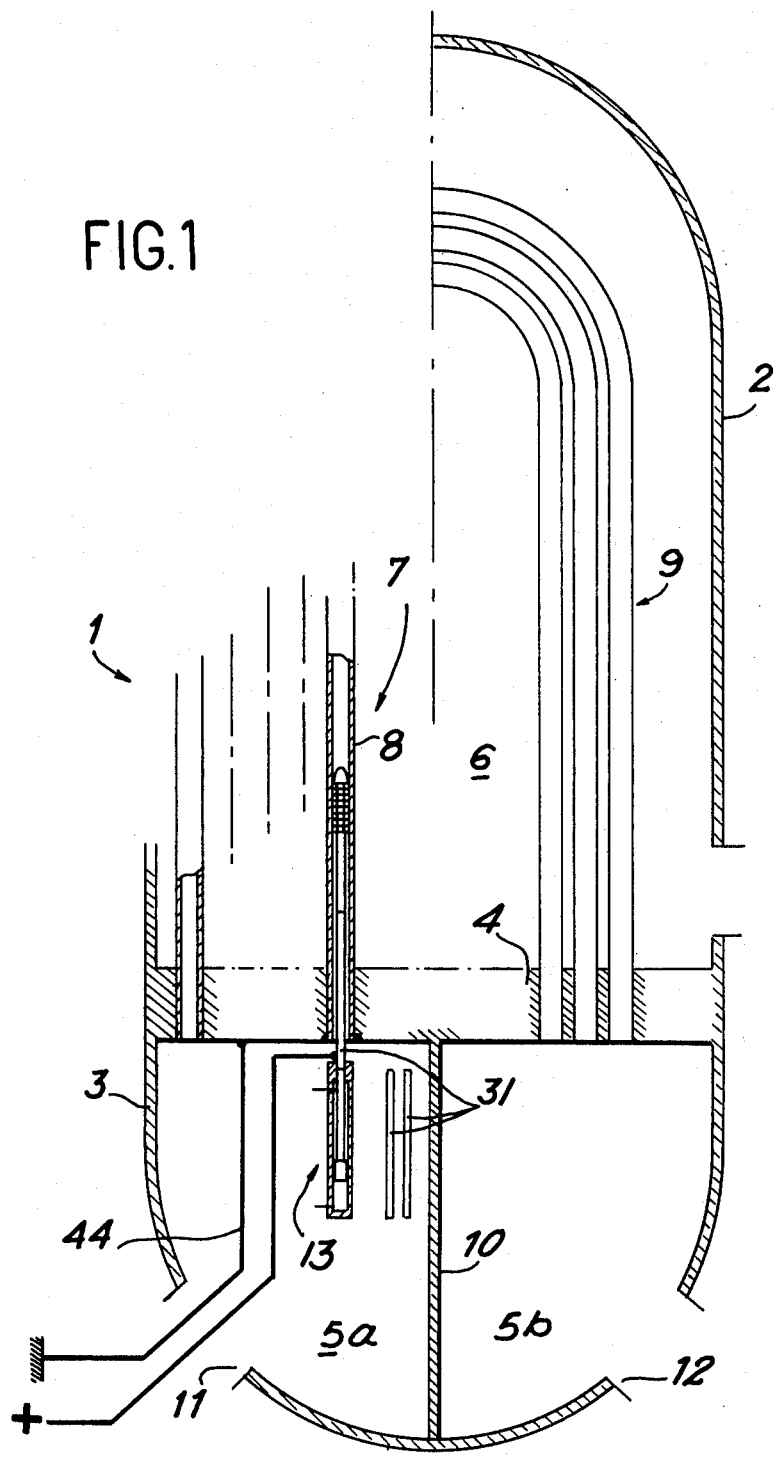
FIG. 1 is a schematic axial part-sectional view of a steam generator which makes use of a sealing-off device according to the invention.

In FIG. 1, the reference numeral 1 designates schematically a complete steam generator of entirely conventional structural design, said generator being constituted in particular by a lateral cylindrical shell 2 and by a hemispherical bottom end 3 which are joined to each other by means of a horizontal transverse plate 4 or tube plate. Two regions 5 and 6 respectively are defined within the steam generator by said tube plate, the first region being reserved for the admission and discharge of a primary fluid whilst the second is traversed by a secondary fluid which exchanges heat with the first through the wall of the tubes 7 of a bundle. In the example of construction which is illustrated schematically, said tubes 7 have a U-shaped profile with two straight parallel legs 8 and 9 respectively, said legs being joined to the tube plate 4 in two opposite regions of this latter. The region 5 located beneath the tube plate is divided transversely and substantially at the center by a vertical partition-wall 10 which delimits two adjacent headers 5a and 5b. Thus the primary fluid which is admitted into the header 5a through an inlet nozzle 11 and discharged from this latter through an outlet nozzle 12 is permitted to supply and to collect the flow through the primary fluid legs 8 and 9. The secondary fluid which is present within the region 6 and introduced into this latter through other ducts (not shown) is in contact with the external surfaces of the tubes 7, the steam thus produced being withdrawn from the heat exchanger through another nozzle (also omitted from the drawings).

The steam generator in accordance with the design concept contemplated by the invention and explained in the foregoing is associated with a device which is generally designated by the reference numeral 13 and makes it possible to plug and seal the internal wall of each tube 7 of the bundle in the event of preliminary detection and location of a leak which has developed in said tube and results in dispersion of primary fluid within the secondary fluid. Serious consequences are liable to arise from this dispersion, either as a result of the particular respective character of these fluids or as a result of their differences in temperature and pressure or else for other reasons.

Figures 2, 5:
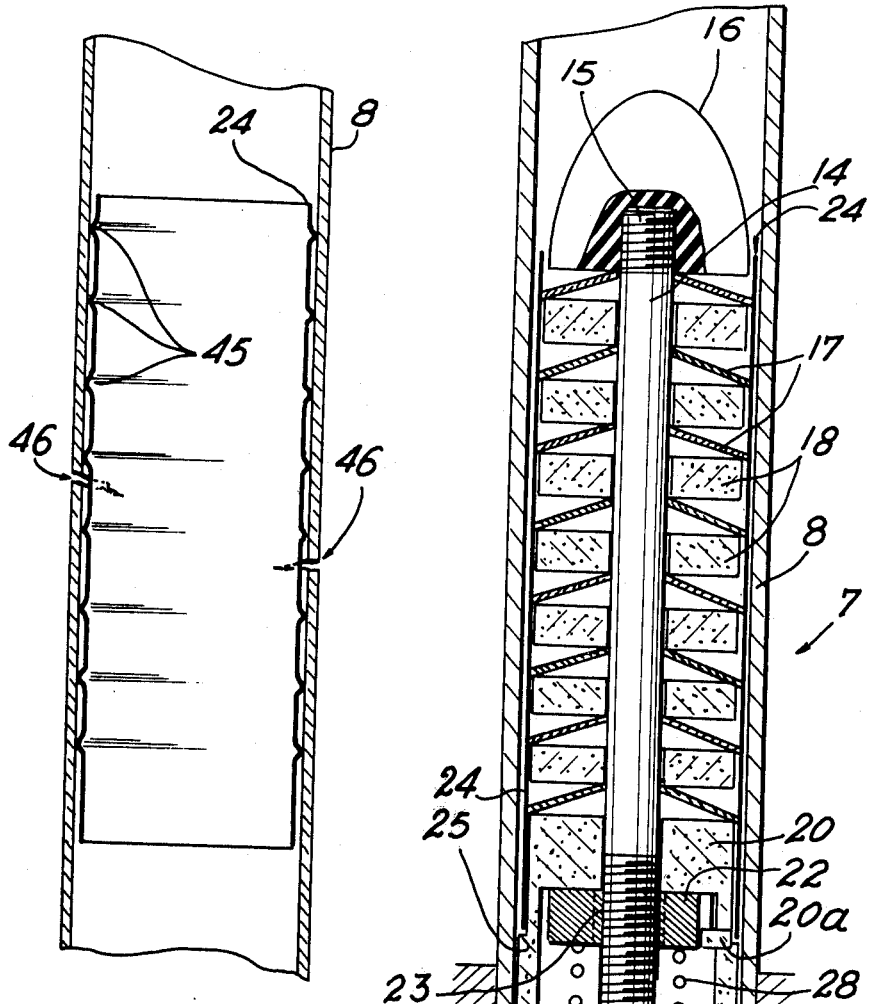
FIG. 2 is an axial sectional view to a larger scale showing a portion of one of the heat-exchanger tubes and of a device in accordance with the invention, said device being mounted within the interior of said tube.
FIG. 5 is an axial, sectional view in a larger scale showing the shape and distribution of circular lines formed by the conical washers within the lining sleeve.
Figure 3:
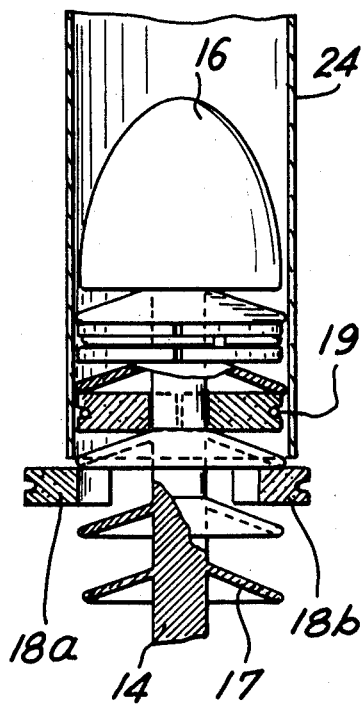
FIG. 3 illustrates an alternative form of construction of a detail of the device shown in FIG. 2 in which the conical washers and the central pin are formed in one piece.

FIG. 2 illustrates to a larger scale the constructional detail of the device 13 for plugging and sealing one of the tubes 7 of the tube bundle in either of its two straight legs 8 or 9, for example in the leg 8 which is joined to the inlet header 5a. This device is mainly constituted by an axial mandrel 14 which is formed of material having good electrical conductivity and the upper end of which is threaded at 15. There is screwed onto said threaded portion an insulating head 16 which preferably has the shape of a bullet-nose cone in order to facilitate penetration of the device into the interior of the tube from the header 5a. Conical metal washers 17 of the dished or so-called "Belleville" type which are preferably of copper or of a suitable copper alloy are previously engaged on the axial mandrel 14 in such a manner as to ensure that the summits of said conical washers are in contact with said mandrel. Cylindrical pastilles 18 of electrical insulating material such as ceramic or a metal having a ceramic coating, for example, are interposed between each of the washers 17. Said pastilles can be formed in one piece and fitted on the mandrel at the time of assembly. Should the mandrel and the resilient conical portions be designed in the form of a single unit, the pastilles can in that case be constituted by two semicircular portions 18a and 18b (as shown in FIG. 3). Said semicircular portions are placed in contiguous relation and maintained in contact against the axial mandrel 14 by means of a retainer ring or like outer connecting means 19.

At the end opposite to the head 16 and to the stack of washers 17 and pastilles 18, the mandrel 14 is associated with a support 20 which is also of electrical insulating material and defines a cavity 21 around the mandrel 14, said mandrel being intended to pass freely through said support. A nut 22 engaged on a threaded portion 23 of the mandrel 14 is mounted beneath said support 20 and secured against rotation by means of a lug 22a. The mandrel and nut thus cooperate in such a manner as to draw the head 16 towards the support 20 to a certain extent when the mandrel is rotated in a screwing movement, thereby subjecting the conical washers 17 to limited flattening by compression. The peripheral edges of said washers which are remote from the mandrel 14 consequently exert a maintaining force on a thin cylindrical metal lining sleeve 24 which has previously been pickled and greased, the external sleeve wall being provided with an electrolytic coating if necessary. Said lining sleeve is passed over said washers so as to fit around these latter, the lower end of the sleeve being applied against an annular shoulder 25 formed on the support 20. By virtue of these arrangements, the assembly constituted by the mandrel 14, the washers 17 and the lining sleeve 24 constitutes a single-piece unit which can readily be engaged with the support and associated elements within the interior of the straight portion 8 of the tube 7 so as to bring the lining sleeve 24 into position opposite to any predetermined region of said tube in which a leak has previously been located and which is to be sealed-off.

At the end opposite to the nut 22, the support 20 has a bottom element 26 and this latter is provided internally with a collar 27 through which the mandrel 14 passes. Said collar serves as a guiding element for a spring 28 which is applied on the one hand against the nut 22 and on the other hand against said bottom element 26, the design function of said spring being to exert a continuous action which has the effect of thrusting said nut 22 against the support 20. At the opposite end, the bottom element 26 is provided with a bore 29 through which the mandrel is intended to pass and with a threaded end-piece 30, an extension sleeve 31 which is also formed of electrical insulating material being connected to said end-piece. Similarly, the threaded end portion 32 of the conductive mandrel 14 which terminates this latter at the lower end is engaged in an actuating rod 33 which is capable of sliding within the extension sleeve 31, thereby exerting a downward force in opposition to the spring 28.

Figure 4:
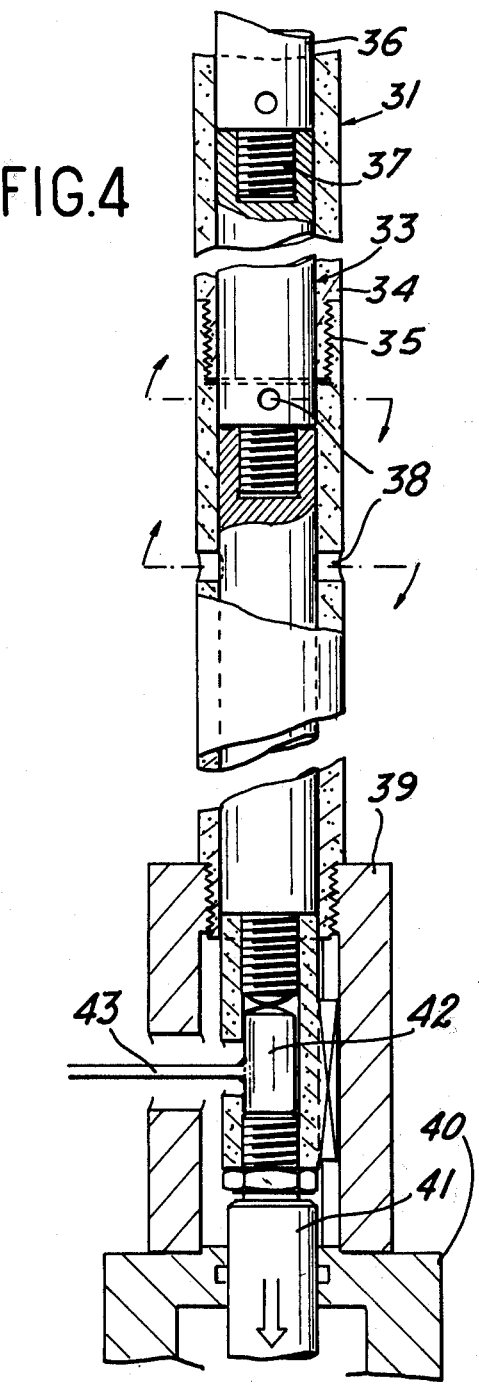
FIG. 4 is a sectional view illustrating the structure of the elements forming an extension of the axial mandrel and the support of the device shown in FIG. 2, said structure being employed for positioning and rigidly fixing a sealing lining sleeve on the internal surface of the tube to be made leak-tight.

In FIG. 4, there are shown more especially the extension sleeve 31 and the actuating rod 33 each constituted by a series of successive elements joined together in end-to-end relation, especially in order to permit of assembly within the header 5a. In the case of the extension sleeve 31, said elements are constituted by sections of hollow tubes 34 which are screwed into each other by means of cooperating threaded portions 35. Similarly, the actuating rod 33 is constituted by solid conductive sections 36 which are screwed successively into each other by means of threaded portions 37 which are advantageously coated with a metallic film such as a gold film, for example, for ensuring good electrical conductivity. Transverse bores 38 formed in the successive elements of the extension sleeve and of the actuating rod make it easier to screw the elements together as the assembly operation proceeds.

The lower end of the extension sleeve 31 as thus constituted is secured to a connecting box 39 and the body 40 of a hydraulic or pneumatic jack is in turn mounted at the lower end of said connecting box. The piston 41 which reciprocates within the connecting box 39 actuates the rod 33, the downward motion of which is transmitted to the mandrel 14. In consequence, said mandrel is drawn towards its support 20, the conical washers 17 being consequently subjected to maximum compression and flattened as a result of displacement of the head 16. The lining sleeve 24 which surrounds the washers is thus subjected to a radial force by the peripheral edges of these latter, thereby forming at the level of each washer a rib which projects in a circular line towards the internal wall of the tube and is applied in intimate contact with this latter.

Moreover, there is mounted between the piston 41 of the control jack and the lower end of the actuating rod 33 an electrical connecting member 42 for connecting said rod through a current generator (not shown) by means of a conductor 43. The current which is delivered passes through the actuating rod, then through the mandrel 14 and finally through the washers 17 towards the sleeve 24 and the tube 7 up to the tube plate 4. Said tube plate is connected to ground through another conductor 44.

FIG. 5 shows to a larger scale the shape and distribution of the circular lines or ribs 45 formed by the washers 17 within the lining sleeve 24, said circular ribs being applied against the straight portion 8 of the tube 7, namely a portion comprising one or a number of perforations or holes 46 to be sealed. The flow of current through the mandrel 14, the washers 17, the lining sleeve 24 and the tube 7 accordingly makes it possible to unite the lining sleeve and the tube by resistance welding at the level of said circular ribs so as to form a strong welded joint and thus to add a sealing element to the tube, thereby ensuring a high standard of leak-tightness at the level of the tube perforations 46. The standard of leaktightness thus achieved increases in proportion to the number of washers 17 and consequently to the number of lines 46 along which the welds are performed. In all cases, perfect resistance welds are obtained by virtue of the high pressure exerted by the washers carried by the mandrel, said washers being separated from each other by the pastilles which are mounted between them. It should further be noted that, since the internal pressure of the primary fluid within the tubes is usually higher than the external pressure of the secondary fluid under operating conditions, no problem arising from any potential danger of weld failures need be expected inasmuch as the lining sleeve is on the contrary applied against the internal surface of the tube under the action of the differential pressure.

As can readily be understood, the invention is not limited to the exemplified embodiment which has been more especially described and illustrated in the accompanying drawings but extends on the contrary to all alternative forms of construction. In particular, it is apparent that the sealing device in accordance with the invention can be employed with heat exchangers other than U-tube units and especially the straight-tube type. In all cases, the device is introduced into each tube and brought into position opposite that region of the tube in which a leak has occurred. This is achieved by mounting the required number of successive extension elements on the extension sleeve and actuating rod. These successive elements which are introduced one by one within a primary fluid header such has a height which is compatible with the dimensions of said header. The current generator which delivers the necessary energy for welding the lining sleeve to the tube is naturally dimensioned according to the distance between the welds to be made and the header. Furthermore, the material of the washers is chosen so as to ensure that it is not liable to be welded to the lining sleeve or to the axial mandrel. Moreover, should it be desired to employ the device in conjunction with an automatic machine of the robot type, the extension sleeves 31 and the actuating rods 33 could be replaced respectively by flexible elements; the control jack could be transferred to the exterior of the water box in this case by passing these elements through the nozzles 11 or 12.

We claim:

1. A device for stopping a leak in a straight portion of a heat-exchanger tube, wherein said device comprises an axial mandrel of material having good electrical conductivity on which are engaged metal washers of revolution having a conical profile and separated by cylindrical insulating pastilles, an insulating head fixed at one end of the axial mandrel and an insulating support mounted at the end opposite to said head, a threaded portion of said mandrel being passed freely through said support and adapted to cooperate with a nut which is applied against the support and serves to exert on the conical washers an adjustable initial compressive stress such that the outer peripheral edges of said washers are applied against a thin cylindrical lining sleeve which is coaxial with the mandrel, the external diameter of said sleeve being smaller than the internal diameter of the tube in which the leak to be stopped is located, means for introducing the support within the lining sleeve and then introducing the sleeve within the tube in order to place said sleeve opposite to a region which includes said leak, means for subjecting the mandrel aforesaid to an axial displacement with respect to said support so that the conical washers are compressed to a maximum extent and thus undergo a change from a conical profile to a more flattened profile so that each washer exerts on said lining sleeve a radial force which applies said sleeve in intimate contact with said tube along a number of circular lines corresponding to the number of washers, and means for passing an electric current successively through the mandrel, the washers, the lining sleeve and the tube in order to joint said tube and said sleeve by means of resistance welds formed along said circular lines.

2. A device according to claim 1, wherein the lining sleeve is a thin tube of material which is either identical or different from that of the tube, the external diameter of said sleeve being slightly smaller than the internal diameter of the tube in order to ensure that said sleeve can readily be displaced without jamming within the straight portion of said tube.

3. A device according to claim 1, wherein the cylindrical lining sleeve is formed of previously degreased and pickled metallic material provided on the external wall thereof with an electrolytic coating which is intended to facilitate resistance welding.

4. A device according to claim 1, wherein the conical washers are formed of copper or of a copper alloy and are of the Belleville washer type.

5. A device according to claim 1, wherein the resilient conical portions and the co-axial mandrel are formed in one piece.

6. A device according to claim 1, wherein the insulating pastilles mounted between the conical washers are formed in one or two parts in contiguous relation and are formed of material which cannot be welded to the mandrel and which cannot be welded to the lining sleeve.

7. A device according to claim 6, wherein the pastilles are formed of ceramic material or of metal provided with a ceramic coating.

8. A device according to claim 1, wherein said support comprises a box adapted to slide within the tube together with the lining sleeve, an electrically conductive actuating rod being rigidly fixed to the end of the mandrel opposite to said head and capable of displacement within a cylindrical insulating extension sleeve of said box.

9. A device according to claim 8, wherein the means for passing an electric current for welding the cylindrical lining sleeve to the tube are constituted by a current generator having one pole connected to the mandrel through the actuating rod whilst the other pole is connected to ground through the tube and the tube plate.

10. A device according to claim 8, wherein the insulating extension sleeve and the conductive actuating rod are formed by successive elements adapted to be respectively assembled together in end-to-end relation by screwing or any other suitable connecting means for ensuring the necessary length of introduction within the tube in order to bring the lining sleeve into position opposite to a region comprising a leak to be stopped.

11. A device according to claim 10, wherein the successive elements of the actuating rod and of the insulating extension sleeve are flexible.

12. A device according to claim 10, wherein the successive elements of the actuating rod comprise connecting portions provided respectively with cooperating external and internal screw-threads provided with a metallic coating having high electrical conductivity in order to improve the flow of electric current from one element to the next.

13. A device according to claim 10, wherein the means for subjecting the mandrel to a displacement with respect to the support are constituted by at least one hydraulic or pneumatic jack, the jack piston being connected to the mandrel by means of the actuating rod and the jack body being rigidly fixed with respect to the insulating extension sleeve.

14. A device according to claim 13, wherein the jack is mounted within one of the primary fluid headers which is delimited within the heat-exchanger shell beneath the tube plate the length of each successive element of the insulating extension sleeve or of the actuating rod being compatible with the height of said header.

* * * * *